Dec. 26, 1944.   J. L. GOUDSMIT   2,365,814
PROCESS OF PRODUCING FLOOR COVERINGS

Filed May 16, 1939

Inventor:
Johan Leon Goudsmit
by Michaelis & Michaelis
Attys.

Patented Dec. 26, 1944

2,365,814

UNITED STATES PATENT OFFICE 2,365,814

PROCESS OF PRODUCING FLOOR COVERINGS

Johan Leon Goudsmit, Nijmegen, Netherlands; vested in the Alien Property Custodian Application May 16, 1939, Serial No. 273,885
In the Netherlands May 24, 1938

1 Claim. (Cl. 154—2)

My invention relates to a process for the production of a floor covering, more especially of the kind which consists of a plurality of superposed layers.

The floor covering according to this invention comprises an upper layer of rubber and a lower layer of felt paper or similar material which is protected against moisture by being impregnated with an easily liquefiable substance such as bitumen.

The drawing affixed to this specification and forming part thereof illustrates diagrammatically by way of example on an exaggerated scale two modifications of my invention.

In the drawing

Fig. 1 is a sectional view of a three layer floor covering while

Figure 1:

Although it is known that rubber possesses properties which make it particularly apt as a floor covering, the use of rubber floor coverings is very limited in practice mainly owing to its high price. For in order to obtain a good and permanent layer on the floor, a rubber layer of about 5 mms. is required, and in many cases it has been found necessary to also glue this layer to the floor.

It has already been suggested to connect a somewhat thinner layer of rubber with an underlayer of some cheap material such as felt paper. Such underlayers however do not prevent the penetration of moisture and must therefore be protected by an impregnation, for instance with asphalt. It is however very difficult to connect such an impregnated layer with a rubber layer.

In the British Patents No. 275,685 and No. 308,504 it has been disclosed to effect this connection by vulcanizing the rubber layer after it has been united with said underlayer. This method has however been proved impracticable because the impregnating substance is liquefied at the temperature required for vulcanization, and then separates from the underlayer so that the homogeneity of the impregnation gets lost.

According to British Patent No. 246,927 an adhesive is applied between the rubber layer and the underlayer. A special glue must be used which at a relatively low temperature sticks to the already vulcanized rubber and to the impregnated underlayer, whereby the process of manufacture is complicated and rendered expensive. In addition thereto it again involves the drawback that the thickness of the rubber layer cannot sufficiently be reduced to obtain a low-priced product. If a rubber layer of less than 2 mms. is employed, the surface is not sufficiently smooth, but is likely to show wrinkles.

According to my invention the rubber layer may be as thin as 1 mm. or even thinner for I connect the rubber layer by vulcanization with another layer, which in the final product acts as an intermediate layer and to which the homogeneously impregnated underlayer can also be attached. The intermediate layer may be made of any material which can be fixed to the rubber layer as well as to the underlayer and which is adapted to strengthen the rubber so that all irregularities of form are avoided. Thin fabrics, preferably jute fabrics, have been found to be particularly suitable. Since this intermediate layer, when connected with the rubber, can be made to adhere to the underlayer of felt paper by a slight pressure and slight heating, the application of an adhesive substance may be dispensed with, so that the floor covering and the process of manufacturing same is simpler and cheaper than hitherto possible.

The fabric layer may be fixed to the under side of the rubber layer in any known manner, for instance by gluing it to the rubber layer before vulcanization and subsequently vulcanizing the two layers together.

Immediately thereafter the underlayer may be fixed thereto in one operation by passing the layers through between a pair of rolls. One of these rolls, viz. that which contacts the impregnated layer of felt paper, may be heated to soften the impregnating substance of the felt paper layer to such degree that connection with the intermediate layer is effected without the impregnating substance becoming thinly flowable.

The paper layer may be fixed on both sides to a rubber layer by means of an intermediate fabric layer whereby it is then not only protected against moisture but also against other influences.

Figure 2:
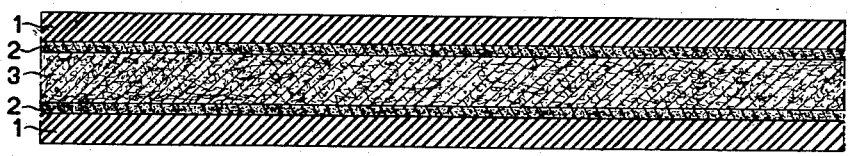
Fig. 2 is a similar view of a five layer covering made according to this invention.

In the two modifications of a floor covering made in accordance with this invention, which are shown in Figs. 1 and 2 of the drawing 1 are layers of vulcanized rubber and having a thickness of about 1 mm. 2 are the intermediate layers, while 3 is a layer of felt paper homogeneously impregnated with a substance such as bitumen.

Various changes may be made in the details disclosed in the foregoing specification without departing from the invention or sacrificing the advantages thereof.

I claim:

The process of manufacturing a floor covering which comprises uniting a rubber layer with a fabric layer by vulcanization, arranging in contact with said fabric layer a layer of felt paper, which is impregnated with an adhesive moistureproofing substance readily liquefiable by heating and uniting the felt paper with the fabric layer by heat and pressure.

JOHAN LEON GOUDSMIT.